No. 759,742.

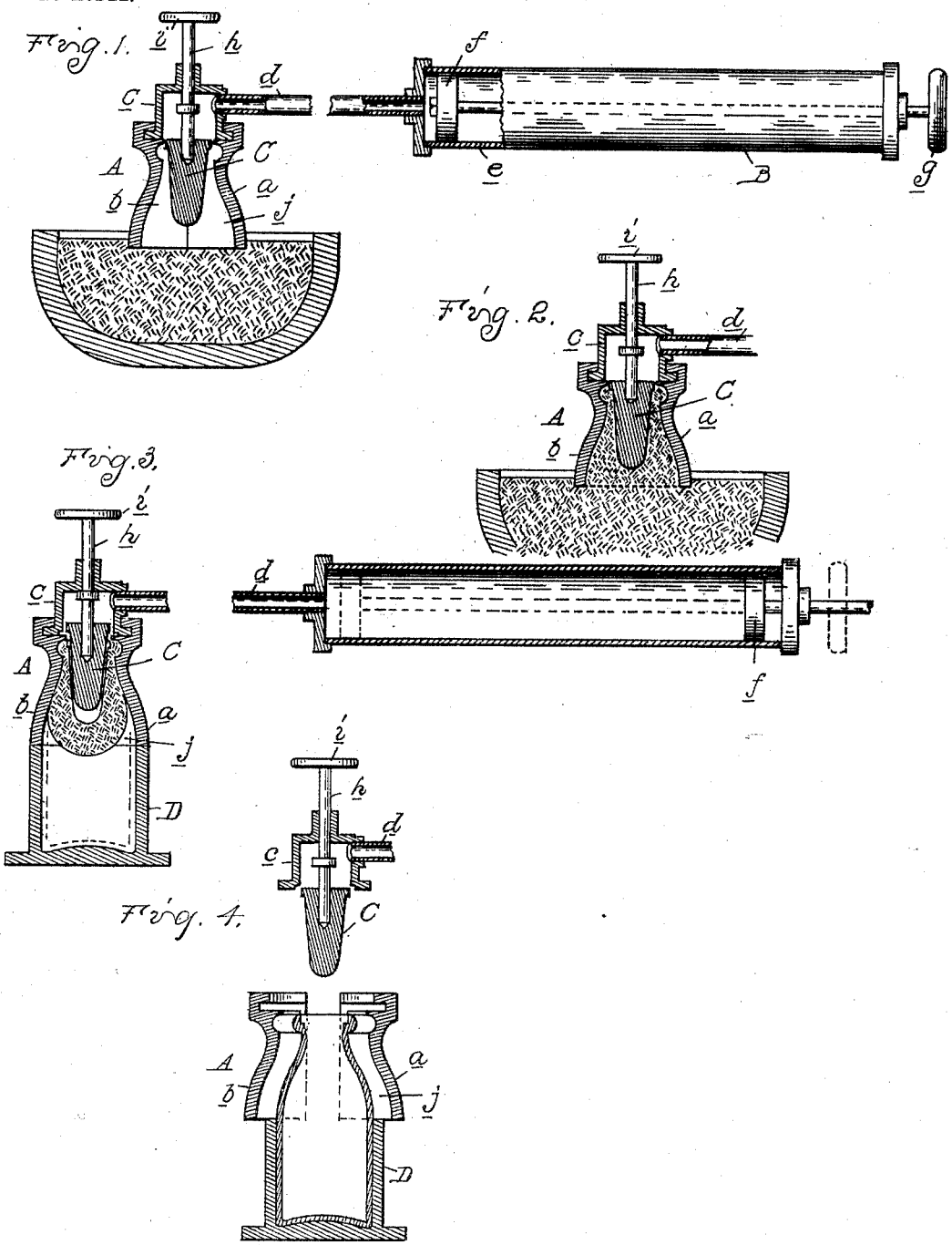

Patented May 10, 1904.

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

METHOD OF BLOWING GLASS.

SPECIFICATION forming part of Letters Patent No. 759,742, dated May 10, 1904.

Application filed December 26, 1899. Serial No. 741,596. (No specimens.)

*To all whom it may concern:*

Be it known that I, MICHAEL J. OWENS, a citizen of the United States, residing at Toledo, in the county of Lucas and State of Ohio, have invented certain new and useful Improvements in Methods of Blowing Glass, of which the following is a specification, reference being had therein to the accompanying drawings.

The invention relates to the method of forming glass articles; and the invention consists in the operations whereby the molten glass is gathered and shaped.

More particularly the invention consists in the operation of gathering the glass by atmospheric pressure or suction and simultaneously giving a portion of said gathering its final shape, and, further, in the particular steps whereby the finished article is produced, as more fully hereinafter described and claimed.

In the drawings I have illustrated an apparatus by which my method may be carried out, and in which—

Figure 1 is a sectional side elevation through the gathering device, showing the same dipped into the molten glass. Fig. 2 is a view similar to Fig. 1, illustrating the molten glass as drawn into the gathering device. Fig. 3 shows the gathering device in connection with the forming-mold with a blank before blown, showing in full lines and in dotted lines the blown article. Fig. 4 illustrates the completely-blown article and the manner of extracting the same from the gathering device and mold.

While I have illustrated a particular form of apparatus for carrying out my method, it is obvious other apparatus might be employed in place of the particular one shown and described.

In the construction shown in the drawings, A represents the gatherer, which consists, essentially, in a hollow receptacle opened at one end and having means for exhausting the air therefrom. This receptacle is shown as comprising two sections $a\ b$, which form the receptacle containing the chamber $j$ for the molten glass, and are detachably secured to a third section $c$, the latter being connected by a pipe $d$ to a suction device, such as the pump B. This pump consists of a cylinder $e$ and piston $f$ therein and an operating-handle $g$.

C is a core adapted in its normal position to project centrally into the chamber within the section $a\ b$, said core being provided with a shank $h$, having an operating-handle $i$, by means of which the core may be partially withdrawn from said chamber.

D is a mold-section which in connection with the gathering device A is adapted to form a complete mold for externally shaping the article to be blown.

The apparatus being constructed as shown and described, the operations for forming the glass article are as follows: The gathering-receptacle A is first dipped into a pool of molten glass, as shown in Fig. 1. The handle $g$ of the pump is then withdrawn, which exhausts the air within the chamber $j$ and causes the molten glass within the pool to be forced up by atmospheric pressure into said chamber, as shown in Fig. 2. The shape of this chamber is such as to impart the proper form to the upper portion of the blown article, (which in this case is a glass jar,) while the core is of such a shape as to form the interior of said upper portion of the article. The filling of the chamber with molten glass, as described, and shown in Fig. 2, will shape and distribute the glass to form a properly-shaped blank in the gathering-receptacle A. It is then lifted from the mass, and if there is no bottom provided (none being shown) it will probably be necessary to turn the receptacle upside down in transferring it by hand to the final shaping-mold, depending somewhat upon the condition of the glass. The receptacle A is then placed over the complementary mold-section D, as shown in Fig. 3. The core C is also partially withdrawn, as shown in the said figure, so as to leave a space between the same and the glass, the latter having been cooled by contact with the core to temporarily hold its shape. The handle $g$ of the pump is then again pressed in, which will cause an air-pressure within the hollow section $c$, the air being blown into the space between the core and the glass, and cause the latter to be expanded until it fills the mold, as shown in dotted lines, Fig. 3. The gatherer may then be removed by separating the sections $a$ and $b$ and lifting the sections $c$, together with the core C, as shown in Fig. 4, after which the blown article may be lifted out from the mold-section D.

It will be noticed that the gatherer A and core C not only serve to form the blank from which the article is blown, but also impart the proper shape to a portion of the finished article, the neck of the jar being externally shaped by the section $a$ and $b$ and internally by the core C. It will also be noticed that articles blown by my method may be formed complete without any appendage for attaching them to the blowpipe, which must be subsequently cut off. Thus after the article is removed from the mold it is entirely finished, requiring neither cutting off, grinding, nor fire-finishing.

It is obvious that my method of gathering and simultaneously shaping the glass might be employed for forming articles which do not need to be blown, and in the broader scope of my invention I desire to include this also.

What I claim as my invention is—

1. Method of making glass articles which consists in gathering the glass from the top of the mass by means of differential pressure at different points thereof, simultaneously shaping the blank, and subsequently blowing the blank to its completed form.

2. The method of making glass articles consisting in forming a blank by gathering a portion from a mass of molten glass by vacuum, simultaneously shaping said blank to have a part of the form of the finished article, and subsequently giving the remainder of said blank its final shape while in a plastic condition from its initial heat.

3. The method of making glass articles which consists in gathering a blank from a mass of molten glass by a vacuum at the gathering-point, and second in blowing said gather to its final form.

4. The herein-described method of making glass articles, which consists in gathering a parison directly from the top of the molten mass, and then blowing that parison into the desired form while plastic from its initial heat.

5. The method of making glass articles which consists in simultaneously gathering and shaping a parison from the top of a molten mass, forming a blow-opening therein, and blowing the same.

6. The method of making glass articles, which consists in gathering directly from the top of a molten mass a parison having a blow-opening and subsequently giving that parison its final form by pressure admitted into said blow-opening.

7. The method of making glass articles which consists in gathering by means of a vacuum directly from a mass of molten metal a definite quantity of glass and simultaneously shaping it into a parison and blowing the parison before it loses its plastic condition.

8. The method of making glass articles, which consists in gathering glass from the mass by means of a vacuum, simultaneously shaping the blank and subsequently blowing the blank to its completed form.

9. The process of manufacturing hollow glass bodies or blanks, consisting in gathering glass from a molten mass and simultaneously forming a hollow blank and partly-finished article.

10. The process of manufacturing hollow glass articles, consisting in gathering the glass from a molten mass and simultaneously forming a hollow blank and partly-finished article, and then blowing said blank to finished form.

11. The process of manufacturing hollow glass bodies or blanks, consisting in gathering glass from a molten mass by suction and simultaneously forming a hollow blank.

12. The process of manufacturing hollow glass articles, consisting in gathering glass from a molten mass by suction and simultaneously forming a hollow blank and partly-finished article, and then blowing said blank to finished form.

13. The process of manufacturing glass articles, consisting in inserting a mold within the molten glass, then drawing the glass therein to form the body or blank, and then blowing said body or blank to finished shape.

14. The process of manufacturing glass articles, consisting in inserting a mold within the molten glass, then drawing said glass therein to form a finished portion and a body or blank, and then finishing said body or blank.

15. The process of manufacturing glass articles, consisting in inserting a mold within the molten glass, then drawing said glass therein by suction to form a finished portion and a body or blank, and then finishing said body or blank.

16. The process of manufacturing glass articles, consisting in inserting a mold within the molten glass, then drawing said glass therein to form a finished portion and a body or blank, and then blowing said body or blank to finished shape.

17. The process of manufacturing glass articles, consisting in inserting a mold within the molten glass, then drawing said glass therein by suction to form a finished portion and a body or blank, and then blowing said body or blank to finished shape.

18. The process of manufacturing glass articles, consisting in inserting a mold within the molten glass, then drawing said glass therein to form a finished portion and a body or blank, and then blowing said body or blank within a mold to finished shape.

19. The process of manufacturing glass articles, consisting in inserting a mold within the molten glass, then drawing said glass therein by suction to form a finished portion and a body or blank, and then blowing said body or blank within a mold to finished shape.

In testimony whereof I affix my signature in presence of two witnesses.

MICHAEL J. OWENS.

Witnesses:
M. B. O'DOGHERTY,
H. C. SMITH.